United States Patent
Åkerstedt et al.

(10) Patent No.: US 7,648,114 B2
(45) Date of Patent: Jan. 19, 2010

(54) GRIPPING DEVICE AND METHOD OF PROVIDING A GRIPPING DEVICE

(75) Inventors: Cecilia Åkerstedt, Trollhättan (SE); Martin C. Widén, Trollhättan (SE); Lasse Aro, Trollhättan (SE)

(73) Assignee: GM Global Technology Operations, Inc., Detroit, MI (US)

( * ) Notice: Subject to any disclaimer, the term of this patent is extended or adjusted under 35 U.S.C. 154(b) by 18 days.

(21) Appl. No.: 11/643,703

(22) Filed: Dec. 22, 2006

(65) Prior Publication Data

US 2007/0170332 A1 Jul. 26, 2007

(30) Foreign Application Priority Data

Dec. 29, 2005 (SE) .................................... 0502925

(51) Int. Cl.
  *B60N 3/10* (2006.01)
(52) U.S. Cl. .......................... 248/313; 296/70; 296/1.07
(58) Field of Classification Search ................. 296/70, 296/37.12, 1.07; 248/311.2, 313
  See application file for complete search history.

(56) References Cited

U.S. PATENT DOCUMENTS

| 4,645,157 | A |   | 2/1987  | Parker          |         |
|-----------|---|---|---------|-----------------|---------|
| 4,728,018 | A |   | 3/1988  | Parker          |         |
| 4,783,037 | A |   | 11/1988 | Flowerday       |         |
| 5,375,805 | A | * | 12/1994 | Sudak et al.    | 248/311.2 |
| 5,704,579 | A |   | 1/1998  | Celentino et al.|         |
| 5,839,710 | A | * | 11/1998 | Hubbard         | 248/311.2 |
| 6,230,948 | B1| * | 5/2001  | Steiger et al.  | 224/539 |
| 6,918,735 | B2| * | 7/2005  | Urban et al.    | 414/729 |
| 2002/0008127 | A1 |   | 1/2002 | Glovatsky et al. |       |
| 2004/0031895 | A1 |   | 2/2004 | Langhoff        |         |
| 2004/0079850 | A1 |   | 4/2004 | Takahashi       |         |

FOREIGN PATENT DOCUMENTS

| DE | 19755621 | 6/1999  |
| EP | 0633162  | 1/1995  |
| EP | 0993985  | 4/2000  |
| EP | 1033282  | 9/2000  |
| EP | 1050430  | 11/2000 |

OTHER PUBLICATIONS

EP 1033282 translation from the EPO website.*
International Type Search Report (PCT/ISA/201).

* cited by examiner

*Primary Examiner*—Glenn Dayoan
*Assistant Examiner*—Melissa A Black
(74) *Attorney, Agent, or Firm*—Harness, Dickey & Pierce

(57) ABSTRACT

A gripping device arranged in a bracket is disclosed. In at least one embodiment, the gripping device includes a gripping element with an adjustable gripping range. The gripping element extends as a substantially closed loop, and is adapted to receive objects of varying shapes and sizes. The gripping device further includes a support structure and a displacing device, the displacing device being adapted to displace the support structure relative to the bracket and adjust the gripping range by changing a distance between a first attachment on the gripping element arranged adjacent the support structure, and a second attachment on the gripping element which is arranged adjacent the displacing device. A corresponding method of providing a gripping device is also disclosed.

11 Claims, 5 Drawing Sheets

GRIPPING DEVICE AND METHOD OF PROVIDING A GRIPPING DEVICE

PRIORITY STATEMENT

The present application hereby claims priority under 35 U.S.C. §119 on Swedish patent application number SE 0502925-1 filed Dec. 29, 2005, the entire contents of which is hereby incorporated herein by reference.

FIELD

Embodiments of the present invention may generally relate to a gripping device, for example to one which is arranged in a bracket. Moreover embodiments of the present invention may generally relate to a method of providing a gripping device.

BACKGROUND ART

In modern vehicles, such as cars, boats and airplanes, various types of cup holders are currently available on the market, which are intended to be mounted in the dashboard of the vehicle or in a central bracket arranged in the vehicle. Cup holders of this type are usually adapted to receive a beverage container, such as a mug, a can or a bottle.

It is very common for the cup holder to consist of a depression which is mainly circular in cross-section and which is adapted to allow the container to be easily inserted and accessed. With this type of adaption, the container is in most cases loosely arranged in the cup holder, which allows the container to move sideways or up and down as the vehicle moves. This is particularly obvious as the vehicle accelerates, when changing the direction or speed of the vehicle, or when the vehicle is driven on an uneven roadway.

In any of these situations, the container may easily fall out of the cup holder, which makes it possible for the beverage in the beverage container to leak out into the passenger compartment or splash onto a passenger. This type of leakage may cause stains on the passenger's clothes, the upholstery and/or other interior fittings in the vehicle. Also, if the beverage is hot, a direct contact with a passenger's skin may cause great discomfort.

A solution to this problem is presented in US20050082455, where the cup holder is provided with a circular elastic ring with an opening at the top which is arranged to have a diameter which is less than 90% of the diameter of a standard size beverage container. When inserting the beverage container in the elastic ring, the ring is stretched outwards and encloses the beverage container so that it will be kept in place.

A drawback of this device is, however, that it is not adapted to receive other objects than precisely circular objects, such as mugs, cans and bottles, and it is thus not suitable to place, for example, a mobile phone in the cup holder.

SUMMARY

Along with the development of, for instance, mobile phones, MP3 players and PDAS, there is now a need for a more general holder, such as a gripping device, which is adapted to receive objects of varying shapes and sizes.

A device and a method are provided, which, in at least one example embodiment, lessens or even eliminates at least one of the above problems. In at least one embodiment, a gripping device is provided; and in at least embodiment, a method is provided.

According to a first aspect of at least one embodiment of the invention, a gripping device arranged in a bracket is provided, the gripping device comprising a gripping element with an adjustable gripping range, the gripping element extending as a substantially closed loop, and the gripping element being adapted to receive objects of varying shapes and sizes, a support structure, and a displacing device which is adapted to displace the structure relative to the bracket, and to adjust the gripping range by changing a distance between a first attachment on the gripping element, which is arranged adjacent the support structure, and a second attachment on the gripping element, which is arranged adjacent the displacing device.

The expression "closed loop" according to at least one embodiment of the present invention, refers to the gripping element as being arranged to include a substantially ring-like structure, whose inner circumference defines the gripping range of the gripping element. The gripping element can advantageously be made of a flexible material, such as rubber or a flexible plastic mixture. Furthermore, the gripping element may, of course, also include a number of components which together form the closed loop, for example a number of interconnected rigid portions.

It will be appreciated that the gripping element can be formed according to other structural patterns, such as a substantially rectangular structure. The support structure mentioned in at least one embodiment of the invention is used to support and/or carry the gripping element. The support structure is suitably arranged so that it constitutes a support under the object that is received by the gripping element, but it may also be arranged, for example, at the side of the gripping element, without departing from the inventive concept. The support structure is preferably made of a light and strong material, such as plastic or metal, but it will be appreciated that other types of material can be used.

The displacing device includes, for example, an elongated rack which is connected to an electrically controlled motor, or an electrically controlled telescopic device (with a displacing function similar to for example an electric antenna).

As described above, the gripping element includes a first and a second attachment, which for example may include a first and a second fixing point, which are arranged adjacent the support structure and the displacing device, respectively.

By adjusting the distance between these two attachments, a change of a clamping force is achieved, which acts on an object received in the gripping element. If, for example, the distance is increased between the two attachments, the gripping element will be stretched, which results in a more elongated shape of the gripping element, and an increase of the clamping force which acts on the object received in the gripping element. On the other hand, the clamping force which acts on the object received in the gripping element is reduced if the distance between the two attachments is reduced as the gripping means returns to an initial receiving position.

To increase the flexibility of the gripping element, the attachments of the gripping element are preferably movably and/or rotatably arranged. For maximum clamping force, the second attachment is usually arranged substantially opposite the first attachment.

With a gripping device according to at least one embodiment of the present invention, it will be possible to hold different types of objects, which have different sizes and shapes, including but not limited to a mug, a bottle, a mobile phone, an MP3 player, a pen, a credit card, a thin-walled plastic mug, etc. The only restriction placed on the object to be received by the gripping element is that there should be room enough within the gripping range of the gripping element. The gripping range of the gripping element can, which is understood by a person skilled in the art, be adjusted to suit the space in which the gripping device is arranged and the type of object that the gripping element is expected to hold.

In an example embodiment, the gripping device includes at least one control unit, which control unit is at least adapted to control the displacing device, and sensors, which sensors are at least arranged in the gripping element, adapted to detect the object which is received by said gripping element, and adapted to supply object-related information to the control unit so that the gripping range can be adjusted, whereby the object is fixed in said gripping element. By object-related information is here meant, for example, the presence of an object, the distance to an object, the structural properties and nature of the object.

By arranging sensors in the gripping element and arranging them to communicate with the control unit which controls the gripping element, the gripping range of the gripping element can be adjusted so that the object received in the gripping element is sufficiently gripped. A sufficient grip combined with a gripping element which is made of an elastic material as mentioned above, makes it possible for the object to be fixed in a favourable manner independently of its shape or size.

The gripping element may further include at least one sensor to activate the gripping element. This sensor prevents the actual adjustment of the gripping range from being begun before the object is properly received in the gripping element. Both the latter sensor and the above-mentioned sensors arranged in the gripping element may include, for example, light sensors, pressure sensors, acoustic sensors, light ray sensors and/or motion sensors.

In a vehicle application, it is currently preferred to use light sensors since they involve low cost. Furthermore the control unit may, of course, constitute part of a central computer system, but can, as will be understood by a person skilled in the art, also be a control unit which is particularly adapted to the present objects of the invention, such as a microprocessor or the like.

In an example embodiment of the present invention, the bracket includes one of a dashboard in a vehicle and a central bracket in a vehicle. Vehicle is meant to include, but is not limited to, a passenger car, a truck, a bus, a boat, a train, an airplane, etc. It will be appreciated that other fields of application are conceivable, and that the gripping device according to at least one embodiment of the present invention can be arranged in other positions in the vehicle.

For maximum flexibility, the gripping device can be adapted to be electronically activated, such as by way of a sensor or a push button. Other electronic activation options are also available, such as, for example, voice activation and motion activation. By activating the gripping device by, for instance, the user's voice, it will be possible for him to activate the gripping device without using his hand.

According to a second aspect, at least one embodiment of the invention concerns a method of providing a gripping device, comprising withdrawing a support structure from a bracket to an outer position by withdrawing a displacing device, adjacent to the support structure there being arranged a first attachment on a gripping element with an adjustable gripping range, the gripping element extending as a substantially closed loop, and the gripping element being adapted to receive objects of varying shapes and sizes, arranging the gripping element in a receiving position, detecting the presence of an object which is received by the gripping element, and returning the displacing device, adjacent to the displacing device there being arranged a second attachment on said gripping element, thereby reducing the gripping range.

As described above with reference to the first aspect of at least one embodiment of the present invention, this method presents the option of gripping various types of objects, which have different sizes and shapes, including but not limited to a mug, a bottle, a mobile phone, an MP3 player, etc.

Additional features and advantages of the present invention, as well as the construction and function of various embodiments of the present invention, will be described below in detail with reference to the accompanying drawings.

BRIEF DESCRIPTION OF THE DRAWINGS

The accompanying drawings, which are part of the description, illustrate current example embodiments of the present invention and are adapted to explain, together with the description, the principles of embodiments of the invention, and to make it possible for a person with knowledge within the technical field involved to use embodiments of the invention. In the drawings, like reference numerals concern identical or functionally similar components.

DESCRIPTION OF EXAMPLE EMBODIMENTS

Figure 1:
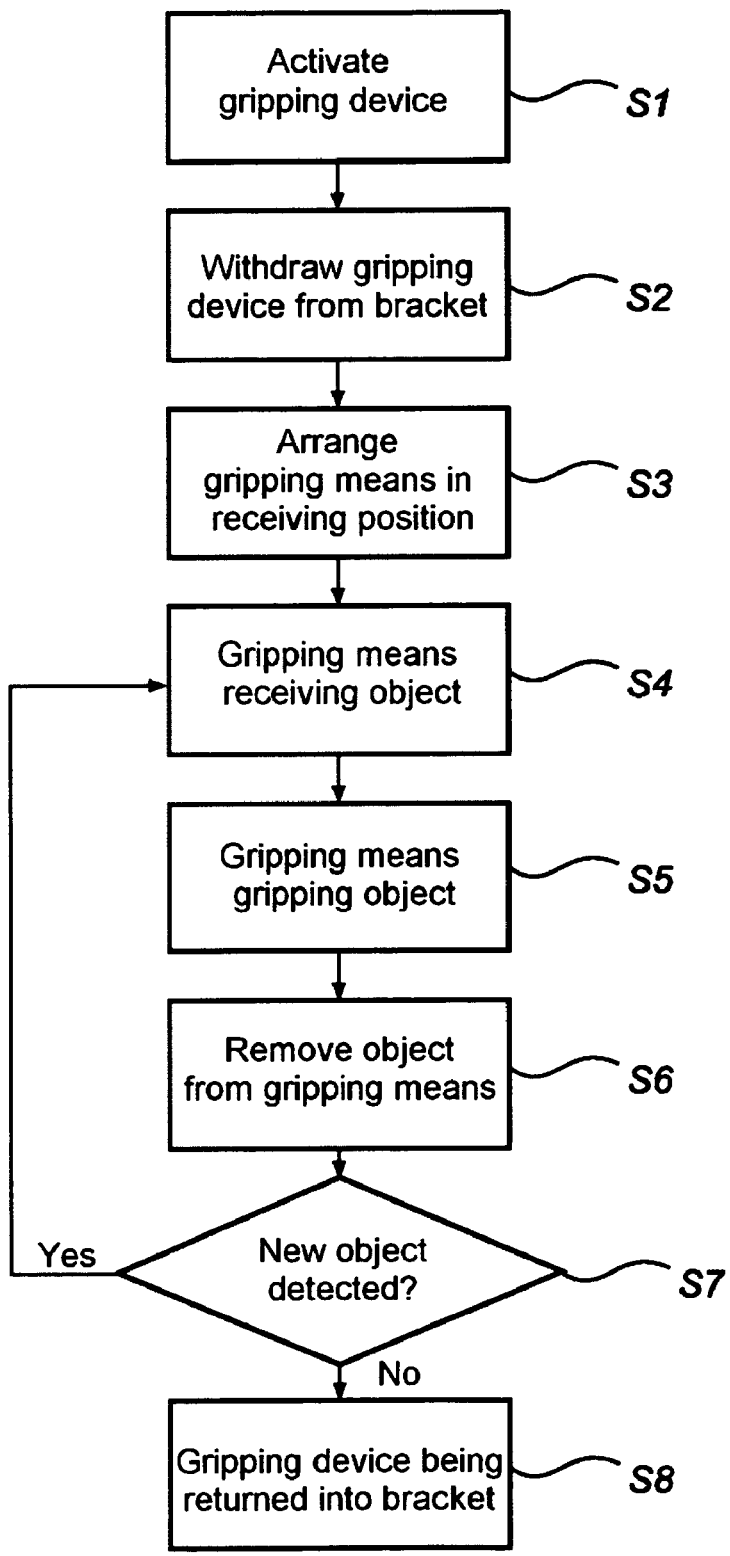
FIG. 1 is a block diagram of the steps of the method according to an embodiment of the present invention.

FIG. 1 illustrates steps of the method according to a current example embodiment of the present invention.

In step S1, the gripping device is activated for use. The activation preferably occurs electronically and can be performed via a sensor, a push button or, for example, using voice activation.

In step S2, a support structure is withdrawn from a bracket, in which the gripping device is arranged, to an outer position by withdrawing a displacing device. Between a first attachment on the support structure and a second attachment on the displacing device, a gripping element with an adjustable gripping range is arranged, which gripping element extends as a substantially closed loop, and which gripping element is adapted to receive objects of varying shapes and sizes.

In step S3, the gripping element is arranged in a receiving position. The gripping element may include, for example, a ring-like gripping structure, and the receiving position of the gripping element is in this case defined as the position in which the ring-like gripping structure is substantially circular.

In step S4, an object is inserted into the gripping element by a user. A sensor is arranged to detect when the object is substantially received by the gripping element. In one embodiment, the sensor includes a light source, for example a diode emitting light, and a light sensor receiving light from the light source.

In step S5, the light ray-has been "interrupted", and the displacing device is moved back a short distance, which results in the gripping element being stretched, the displacing device thus adjusting the gripping range, whereby the gripping element grips the object.

In step S6, the user has removed the object from the gripping element so that the light sensor again receives the light emitted from the light source.

The gripping device can then, which is indicated in step S7, either be returned into the bracket, step S8, or be used again to receive an object according to step S4.

The return of the gripping device, step S8, takes place in a manner corresponding to step S1 preferably electronically, such as automatically after a predetermined time, via a sensor or a push button, or for instance by a voice command.

The method steps S1 to S5 above will now be described in more detail with reference to FIGS. 2a-2d.

Figure 2A:
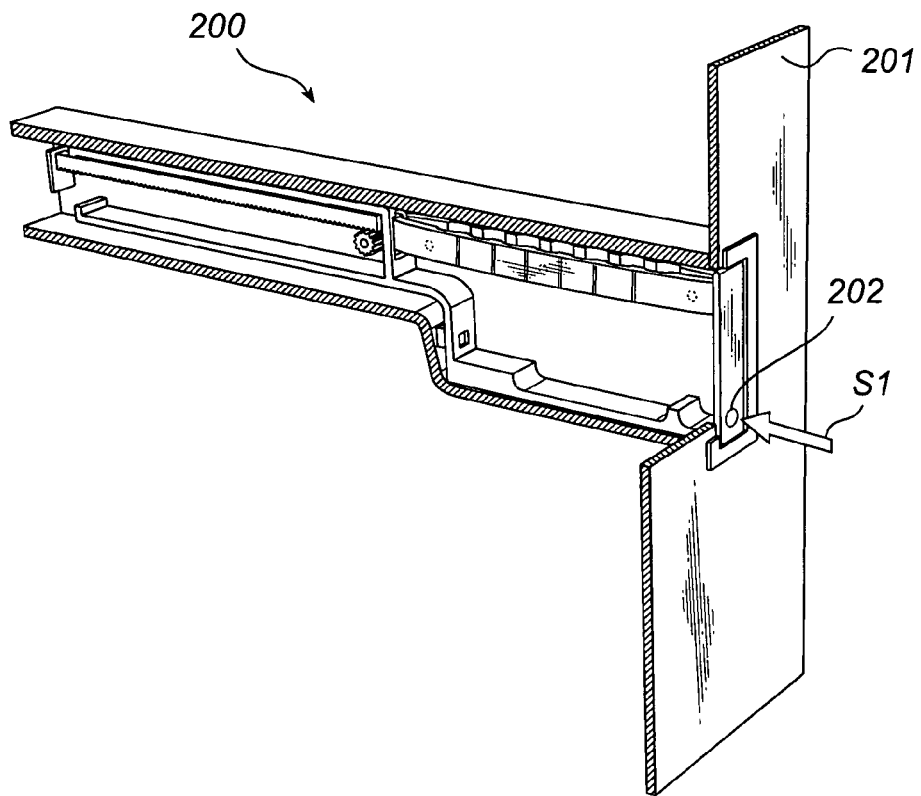
FIGS. 2a-d show four different positions of a gripping device according to an example embodiment of the present invention.

FIG. 2a shows a gripping device 200 which is arranged in a bracket 201 according to a current example embodiment of the present invention. In this case the gripping device 200 is completely inserted in the bracket 201. The gripping device 200 further includes a sensor 202 which can be used to activate the gripping device 200 to allow it to be used. A person with knowledge within the technical field realises that other activating devices can be used, including but not limited to a push button, for example.

In an alternative embodiment, the gripping device 200 is provided with a transceiver which can be used to detect an RFID tag. In this case the gripping device 200 can be activated by an object fitted with an RFID tag, for example a beverage bottle fitted with an RFIF tag, being moved close to the gripping device 200.

Figure 2B:
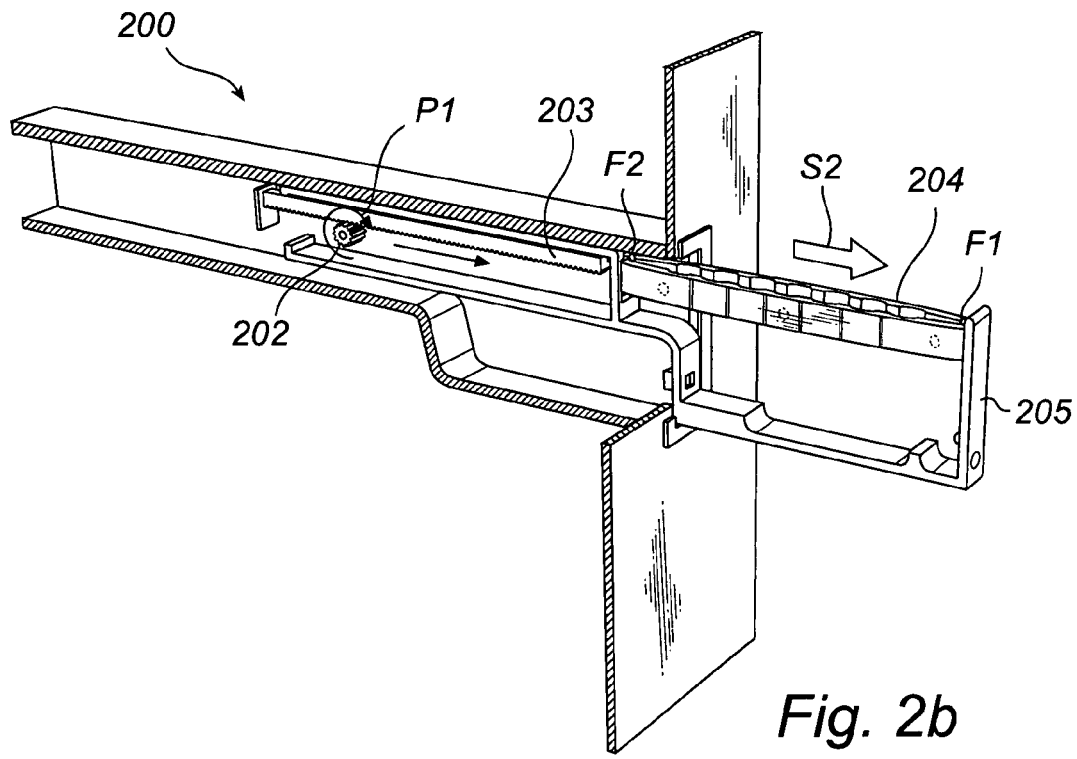

FIG. 2b shows the gripping device 200 in the case where it is to be withdrawn from the bracket 201. The gripping device 200 includes a cogwheel 202, a displacing device 203, and a gripping element 204 which in a first attachment F1 is connected to a support structure 205 and in a second attachment F2 connected to the displacing device 203, which is arranged as a rack for example. The gripping device 200 is withdrawn from the bracket 201 by a "forward" force (indicated by arrow P1) being supplied to the cogwheel 202, which is connected to an electric motor (shown as 302 in FIG. 3).

Figure 2C:
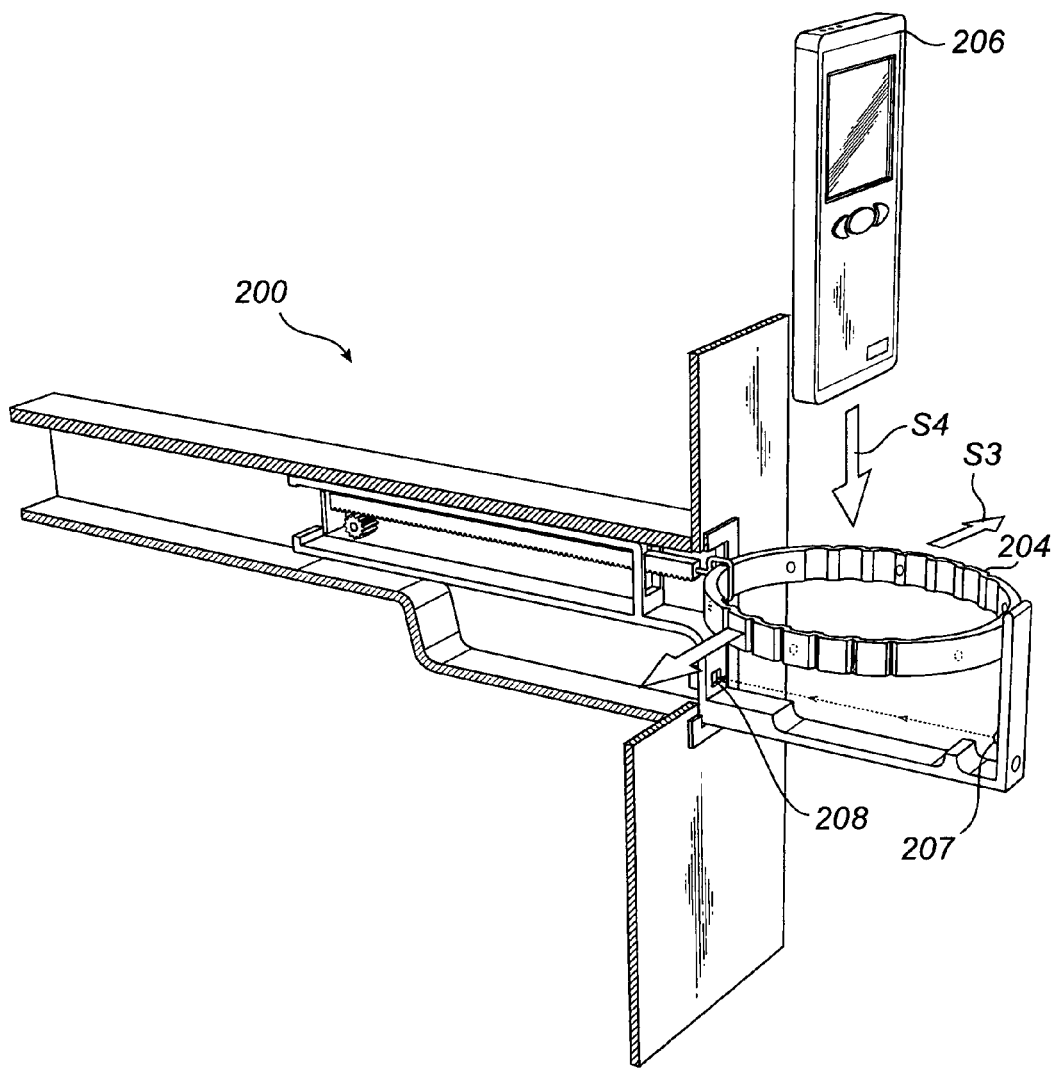

FIG. 2c shows the gripping device in the position where it is arranged to receive an object 206. The gripping element 204 has in this case been expanded so as to be of a substantially circular shape. FIG. 2c also shows a light source 207 emitting light which is received by the light sensor 208. The light source 207 in combination with the light sensor 208 constitutes a light ray sensor arrangement, which in the present embodiment is used to detect whether an object 206 is substantially received by the gripping element 204 (detects if the light ray is interrupted).

Figure 2D:
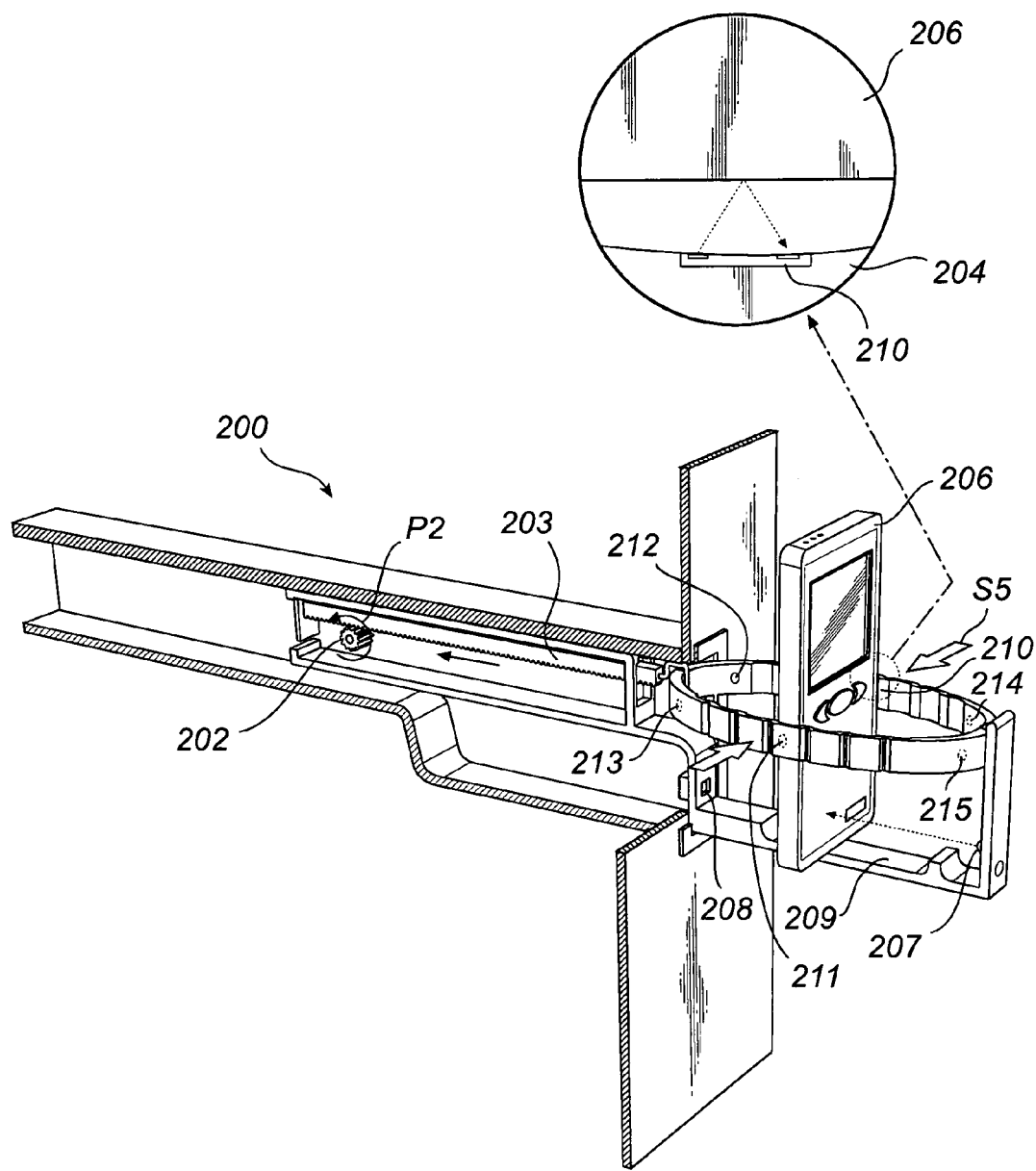

FIG. 2d finally shows the position where the object 206 has been received against a receiving surface 209, and the gripping element 204 grips the object 206. The light ray that was previously emitted by the light source 207 and received by the light sensor 208 has now been interrupted, and a "backward" force is supplied to the cogwheel 202, which results in the displacing device 203 being returned (which is indicated by arrow P2). This, in turn, causes the gripping element 204 to be stretched, which results in a clamping force acting on the object 206.

The gripping element 204 further includes six sensors 210-215. The sensors 210-215 are arranged in the gripping element 204, and adapted to detect the object 206. The sensors 210-215 are further adjusted to supply object related information to a control unit (shown as 301 in FIG. 3), so that the gripping range of the gripping element 204 is adjusted, whereby the object 206 is fixed in the gripping means 204 (that is the motor is stopped).

An enlarged part of FIG. 2d shows one sensor 210 of the sensors 210-215, which in an example embodiment is a reflection sensor. A reflection sensor includes a transmitter and a receiver. The transmitter sends a light ray which is reflected by the object 206. When the object 206 is at a predetermined distance, the reflected light ray hits the receiver, and the reflection sensor communicates that an object has been detected. In an example embodiment, the predetermined distance is about 1 mm.

Figure 3:
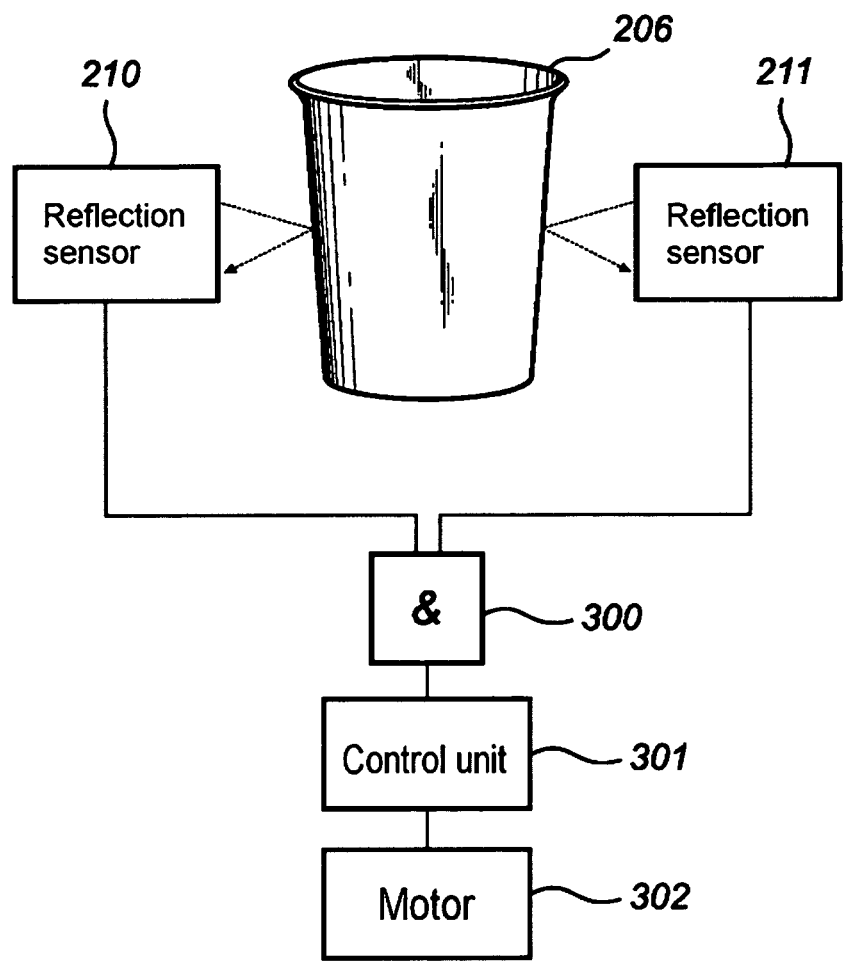
FIG. 3 illustrates a sensor arrangement and a simplified wiring diagram.

In an example embodiment, two opposite sensors have to be activated for the motor to be stopped. This is shown in FIG. 3, in which two sensors 210 and 211 are arranged to cooperate via an and-gate 300. The output signals from the sensors 210 and 211 are connected to the inputs of the and-gate 300, which supplies a detection signal to the control unit 304 only when the two sensors 210 and 211 detect an object 206, such that the motor 302 stops.

Figure 4:
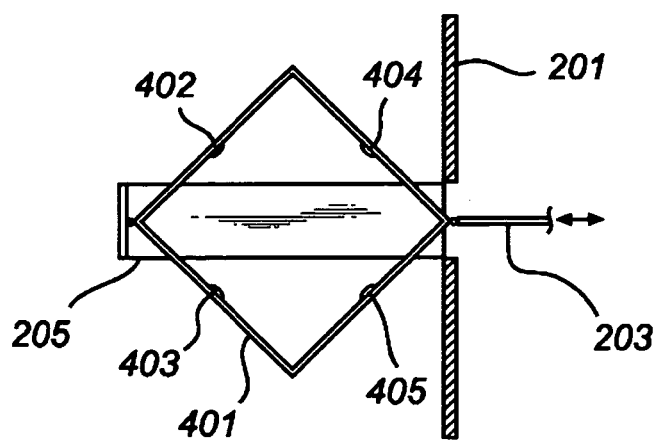
FIG. 4 illustrates a gripping element according to an alternative embodiment of the present invention.

An alternative embodiment of a gripping element 401 is shown in FIG. 4. In this case, the gripping element 401 is a rectangular structure. The gripping element includes in this case only four sensors 402-405.

Finally, it should be added that the invention is in no way limited to the described example embodiment. For example, the gripping device according to at least one embodiment of the present invention may further include a device for detecting the type of object that is gripped and adjust the grip thereto. In a special case, the displacing device could be displaced so that the first and the second attachment of the gripping element practically meet, in which case a compressive force will instead act on an object received by the gripping element. The advantage of this embodiment is that the gripping element will be able to receive objects of a flat and comparatively wide type, and that a flat side of the object can be oriented towards the passenger compartment so that the driver and/or a passenger can view this flat side.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A gripping device arranged in a bracket, said gripping device comprising:
   a flexible gripping element with an adjustable gripping range, said gripping element extending as a substantially closed loop and being adapted to receive objects of varying shapes and sizes;
   a support structure fixed to the gripping element at a first attachment of the loop;
   a displacing device fixed to the gripping element at a second attachment of the loop, the displacing device being adapted to:
      displace said support structure relative to said bracket, and
      adjust said gripping range by changing a distance between the first attachment on said gripping element, which first attachment is arranged adjacent said support structure, and the second attachment on said gripping element, the second attachment being arranged adjacent said displacing device; and
   at least one control unit, at least adapted to control said displacing device, and
   sensors, the sensors being at least:
      arranged in said gripping element, adapted to detect said object received by said gripping element, and adapted to supply object-related information to said control unit so that said gripping range is adjustable, whereby said object is fixed in said gripping element.

2. A gripping device as claimed in claim 1, wherein said gripping device further comprises at least one sensor to activate said gripping element.

3. A gripping device as claimed in claim 1, wherein said gripping device is electronically activated.

4. A gripping device as claimed in claim 3, wherein said gripping device is activated by at least one of voice activation, motion activation, a sensor, and a push button.

5. A gripping device as claimed in claim 2, wherein said sensors are selected from a group of sensors comprising light sensors, pressure sensors, acoustic sensors, motion sensors, and light ray sensors.

6. A method of providing a gripping device, comprising:
withdrawing a support structure from a bracket to an outer position by withdrawing a displacing device, adjacent to said support structure, the support structure being fixed at a first attachment on a flexible gripping element with an adjustable gripping range, said gripping element extending as a substantially closed loop and being adapted to receive objects of varying shapes and sizes;

arranging the gripping element In a receiving position by extending the displacing device to a first position;

detecting the presence of an object received by the gripping element;

returning said displacing device to a second position, adjacent to said displacing device thereby reducing said gripping range, the displacing device being fixed at a second attachment on said gripping element;

collecting object-related information about an object received in said gripping element from sensors arranged in said gripping element; and adjusting said gripping range by said object related information.

7. A method as claimed in claim 6, further comprising:
returning said support structure into said bracket.

8. A method as claimed in claim 6, further comprising:
electronically activating said gripping device.

9. A method as claimed in claim 8, wherein said gripping device is activated by at least one of voice activation, motion activation, a sensor, and a push button.

10. A method as claimed in claim 7, further comprising:
electronically activating said gripping device.

11. A method as claimed in claim 10, wherein said gripping device is activated by at least one of voice activation, motion activation, a sensor, and a push button.

* * * * *